United States Patent [19]

Gulczynski

[11] Patent Number: 4,956,760

[45] Date of Patent: Sep. 11, 1990

[54] HIGH POWER SWITCHING POWER SUPPLY HAVING HIGH POWER FACTOR

[76] Inventor: Zdzislaw Gulczynski, P.O. Box 441, Winchester, Mass. 01890

[21] Appl. No.: 304,509

[22] Filed: Jan. 31, 1989

[51] Int. Cl.$^5$ .......................................... H02M 3/335
[52] U.S. Cl. ...................................... 363/16; 363/37; 363/80
[58] Field of Search ...................... 363/15, 16, 37, 80, 363/86, 89, 50; 323/266, 222, 224

[56] References Cited

U.S. PATENT DOCUMENTS 4,092,712  5/1978  Harrigill, Jr. et al. ................. 363/16
4,692,851  9/1987  Attwood ................................ 363/16

*Primary Examiner*—Peter S. Wong

[57] ABSTRACT

The switching power supply has a high output power, high efficiency and high power factor. The input signal may be AC or DC. The input current may be substantial even when the input voltage is 0V (zero volts). In order to minimize any distortions, the average input current is sine wave with DC superimposed thereon. No separate power factor correction circuit is employed. Inrush, surge currents and voltage spikes are completely eliminated.

The switching power supply includes a transformer for providing the output signal. At least one capacitor is coupled to ground for storing a voltage. Two switches successively apply voltages of opposite polarities, i.e. the input voltage and capacitor voltage, across primary of the transformer. A charging circuit inverts a polarity of the input voltage and charges the capacitor.

18 Claims, 2 Drawing Sheets

HIGH POWER SWITCHING POWER SUPPLY HAVING HIGH POWER FACTOR

CROSS REFERENCE TO RELATED INVENTIONS

This invention is related to: "Switching Power Apparatus with 3-State Driver" Ser. No. 517,853 filed 05/02/90;
"Capacitive Load Driver with Binary Output" Ser. No. 474,488 filed 02/02/90;
"3-Terminal Bidirectional Switching Power Supply with AC or DC Input and AC or DC Output" Ser. No. 444,729 filed 12/01/89;
  "Switching Power Supply with Constant or Sinusoidal Input Current and with Fixed or Variable Output Voltage" Ser. No. 444,730 filed 12/01/89;
"Switching Power Supply with Constant or Sinusoidal Input Current" Ser. No. 393,391 filed 08/14/89;
"Switching Power Supply Comprising Pair of Converters for Obtaining Constant or Sinusoidal Input Current and Fixed or Variable Output Voltage" Ser. No. 393,392 filed 08/14/89;
"Ultra Efficient Switching Power Amplifier" Ser. No. 363,213 filed 06/08/89;
"Synchronous Switching Power Supply Comprising Buck Converter" Ser. No. 363,325 filed 06/08/89;
"Synchronous Switching Power Supply Comprising Boost or Flyback Converter" Ser. No. 363,326 filed 06/08/89;
"Synchronous Switching Power Supply with Boost and/or Flyback Converters" Ser. No. 363,327 filed 06/08/89;
"High Power Switching Power Supply" Ser. No. 338,327 filed 04/17/89;
"High Efficiency Power Factor Correction Circuit" Ser. No. 338,328 filed 04/17/89;
"Ladderless True Flash Analog-to-Digital Converter with Automatic Calibration" Ser. No. 304,505 filed herewith;
"Segmented Encoder and Digital Memory Particularly for Flash Analog-to-Digital Converters" Ser. No. 304,506 filed herewith;
"Ultra Fast Digital-to-Analog Converter with Independent Bit Current Source Calibration" Ser. No. 304,507 filed herewith;
"High Power Switching Power Supply with High Power Factor" Ser. No. 304,508 filed herewith;
"High Accuracy Reference Ladder" filed herewith, now U.S. Pat. No. 4,929,848 dated 05/29/90;
"Power Switch Driver" Ser. No. 229,914 filed 08/08/88; "Synchronous Switching Power Supply with Flyback Converter" U.S. Pat. No. 4,853,837 dated 08/01/89;
"High Efficiency Power Amplifier Comprising Multilevel Power Supply" U.S. Pat. No. 4,871,980 dated 10/03/89;
"Switching Power Amplifier" U.S. Pat. No. 4,763,080 dated 08/09/88;
"Switching Circuits Performing Thyristor and Triac Functions" U.S. Pat. No. 4,845,391 dated 07/04/89;
"Switching Power Supply" U.S. Pat. No. 4,803,610 dated 02/07/89; and
"Switching Power Supply" U.S. Pat. No. 4,736,286 dated 04/05/88.

All inventions are by the same inventor.

BACKGROUND OF THE INVENTION

The invention relates to switching power supply (SPS) receiving AC line voltage or DC voltage, particularly for power supply systems requiring high output power, high efficiency and high power factor.

Conventional SPSs convert AC energy source, e.g. line, into DC voltage. In particular, the AC voltage is rectified and further applied to an input capacitor. Charging the capacitor causes inrush current and surge currents every peak of the AC voltage. Pulse width modulation (PWM) is used which results in numerous problems including high circuit complexity, stability problems and significantly higher effective switching frequency. Numerous interference suppressors and protection circuits are inevitable. Power factor correction circuits are employed which further increase complexity and decrease efficiency.

Power factor correction circuits employ a boost switching circuit. Rectified line voltage is applied thereto. Therefore, switching frequency or PWM varies in a large range. The circuit is practically inoperative near line voltage crossover. The voltage provided by the boost circuit is inherently greater than the peak of the line voltage. This value is especially large e.g. in European countries. A troublesome mechanical switch for reducing capacitor voltages is employed. The power factor correction circuit operates as separate input unit and is excluded from the power conversion itself. In particular, the correction circuit must sustain a full power of the SPS. Moreover, the inrush current is inevitable.

Power factor well defines performance of an SPS. It is a ratio of the SPS output power over input power. The input power is input AC voltage multiplied by RMS input current. The power factor is often specified only for the correction circuit. In fact, the power factor depends on efficiency of the entire SPS. An exemplary approach to a high efficiency SPS is disclosed in the abovementioned U.S. Pat. No. 4,736,286 entitled "Switching Power Supply" dated 04/05/88, by the same inventor. The SPS disclosed therein converts AC signal into AC and/or DC signal while employing a minimum number of switching and inductive components. In particular, FIG. 4a embodiment disclosed in U.S. Pat. No. 4,736,286 employs a single inductive component and single capacitor which is not coupled to the SPS input.

SUMMARY OF THE INVENTION

The present invention is intended to provide an SPS having a high output power, high efficiency and high power factor. The input signal may be AC or DC. The high power and high efficiency are achieved by successively applying voltages of opposite polarities across primary of a power transformer, wherein only one transistor is activated. A separate transistor switch operates independently, whereby a sinusoidal input current and high power factor are obtained. No separate power factor correction circuit is employed.

Inrush, surge currents and voltage spikes are completely eliminated. Capacitor voltages do not depend directly on the peak of the line voltage and may be relatively small. Moreover, the input current may be substantial even when the input voltage, e.g. line, is 0V (zero volts). In order to minimize any distortions, the input current is a sine wave with DC superimposed thereon. The value of the DC depends on the SPS output current so that the best possible component utilization is accomplished.

SPS according to the present invention converts input signal into output signal and comprises an inductive means for providing the output signal, a capacitive means coupled to ground for storing a voltage, a switch means for alternatively applying the input signal or capacitive means voltage to the inductive means, and a charging means for inverting a polarity of the input signal and charging the capacitive means.

In one embodiment the capacitive means includes a pair of capacitors coupled to ground and further separately coupled to the charging means and inductive means. In another embodiment the capacitive means includes a pair of capacitors coupled to the inductive means and further separately coupled to the charging means and ground.

Flyback converter is one of three basic configurations for converting a predetermined DC input voltage into a desired DC output voltage. The flyback converter inverts the input voltage and comprises switch, diode and inductor tied together and further coupled to the converter input, output and ground respectively. For instance, if the input voltage is negative, the output voltage is positive, wherein the diode has cathode coupled to the output.

BRIEF DESCRIPTION OF THE DRAWINGS

The present invention will become more clear in conjunction with the accompanying figures throughout which similar references denote similar parts and of which.

DETAILED DESCRIPTION OF THE INVENTION

Figure 1:
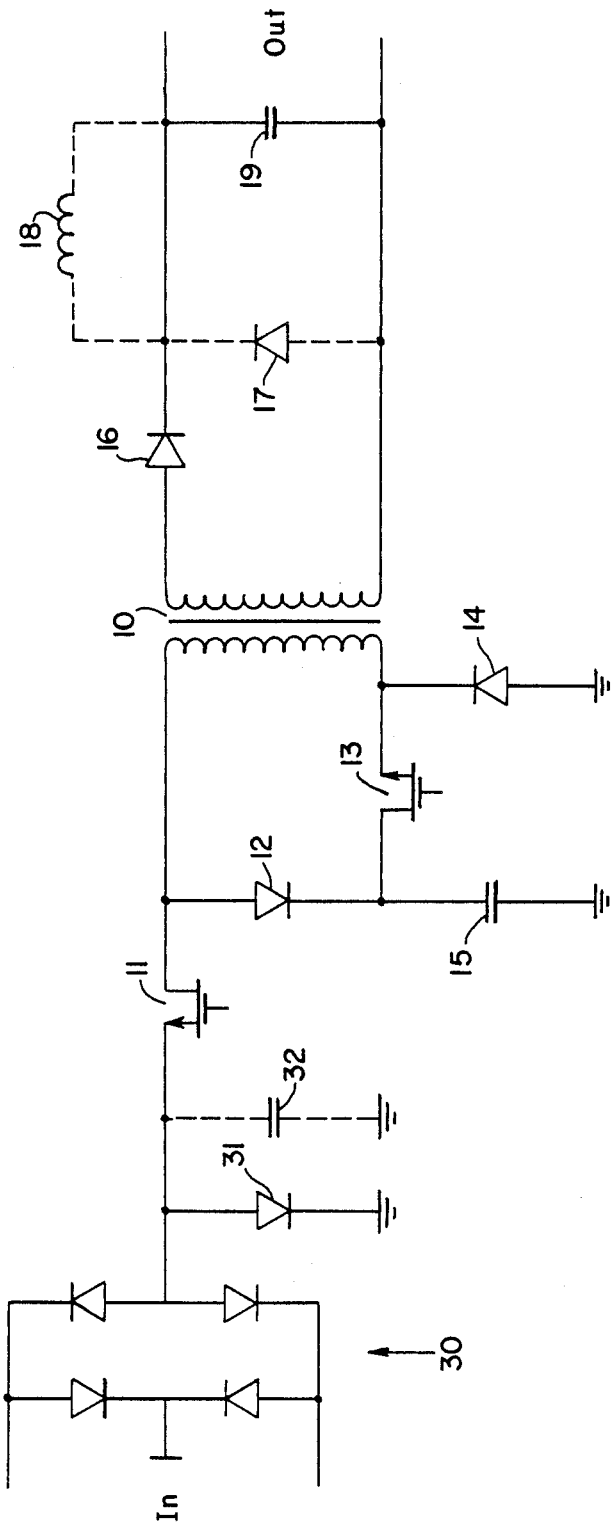
FIG. 1 is the embodiment of low power SPS based on FIG. 4a disclosed in the aforementioned "Switching Power Supply" U.S. Pat. No. 4,736,286 dated 04/05/88, by the same inventor.

FIG. 1 is the embodiment of low power SPS based on FIG. 4a disclosed in the aforementioned "Switching Power Supply" U.S. Pat. No. 4,736,286 dated 04/05/88, by the same inventor. The input voltage is AC, e.g. line voltage. The diode bridge 30 is coupled in series with line for obtaining a negative rectified voltage. The transistor 11 is coupled in series with the rectified input signal, whereby sinusoidal input current can be simulated.

When the rectified line voltage is below a negative threshold, the transistor 11 is switched and transistor 13 is off. When the transistor 11 is on, the SPS input current flows therethrough and further thru the primary of the transformer 10 and diode 14 to ground. Thereby, the rectified line voltage is applied across the primary. When the transistor 11 is off, the current continues to flow in the primary, e.g. due to a leakage inductance thereof. The diode 12 conducts the current and capacitor 15 is charged to a positive voltage.

When the rectified line voltage is above the threshold, the transistors 11 and 13 are switched simultaneously. When the transistors 11 and 13 are on, the input current flows therethrough and further thru the primary of the transformer 10 and capacitor 15 to ground. Thereby, the voltage applied across the primary is the rectified line voltage increased by voltage across the capacitor 15 which is discharged. When the transistors 11 and 13 are off, the current continues to flow thru the diodes 12, 14 and the capacitor 15 is charged.

The voltage across the capacitor 15 varies in a small range. This is achieved e.g. by varying the threshold. When the positive capacitor voltage and negative threshold are set to half the peak value of the line voltage, the voltage applied across the primary of the transformer 10 varies in range 2:1. The capacitor 15 is charged during the transformer reset, i.e. when the transistors 11 and 13 are off. Moreover, the capacitor voltage does not depend directly on the peak of the line voltage and may be relatively small, e.g. +50V. For instance, the SPS will operate in European countries, wherein a mechanical switch for determining the capacitor voltage is unnecessary.

The transistor 11 or transistors 11 and 13 are turned on after a core reset of the transformer 10. When the transistor 11 is off, transistor 13 is also off. The transistors 11 and 13 are n-channel MOSFETs. In particular, the source of the transistor 11 is coupled to output of the diode bridge 30. The drain of the transistor 13 is coupled to the capacitor 15. The drain of the transistor 11 and source of the transistor 13 are coupled across the primary of the transformer 10. The transistor 13 must sustain the capacitor voltage which is relatively low.

The transistors 11 and 13 can be turned on for a fixed period and remain off for any period of time. These periods are preferably equal while the SPS provides a maximum output current, i.e. under full load condition. A minimum switching frequency is limited by determining a maximum pulse width. A control circuit driving the transistors 11 and 13 monitors the rectified line voltage, capacitor voltage and SPS output voltage, wherein comparators can be employed as to avoid an analog feedback. The current flowing thru the primary can be also monitored by means of comparators as to determine the transformer reset and short circuit current of the SPS. Another comparator can be employed to compare an average input current of the SPS against expected sine wave sample.

Power failure protection is accomplished by means of the diode 31 which is coupled between the output of the diode bridge 30 and ground. The diode 31 conducts when line fails and transistors 11 and 13 are turned on, wherein the capacitor 15 delivers the energy. The optional capacitor 32 is coupled in parallel with the diode 31 for reducing input current spikes due to the interrupted drain current of the transistor 11. The capacitor 32 has relatively small value so that the rectified line voltage is crudely filtered.

The SPS operates in flyback mode when the transformer 10 is employed to store energy. The diode 16 is coupled is series with the secondary. The capacitor 19 is coupled to the diode 16 and also across the SPS output. When the transistor 11 or transistors 11 and 13 are on, the diode 16 is reverse biased. The transformer energy and current flowing thru the primary are increasing. When the transistors 11 and 13 are off, the diode 16 conducts and the energy stored in the transformer 10 is delivered to the capacitors 15, 19 and load.

The SPS operates in forward mode when the transformer 10 is employed to directly couple the energy. The diode 17 is coupled across the secondary via the diode 16. The inductor 18 is coupled in series with the diode 16. When the transistor 11 or transistors 11 and 13 are on, the diode 16 conducts and diode 17 is reverse biased. A current flows thru the secondary and inductor 18 is charged. When the transistors 11 and 13 are off, the diode 17 conducts and the energy stored in the inductor 18 is delivered to the capacitor 19 and load.

Figure 2:
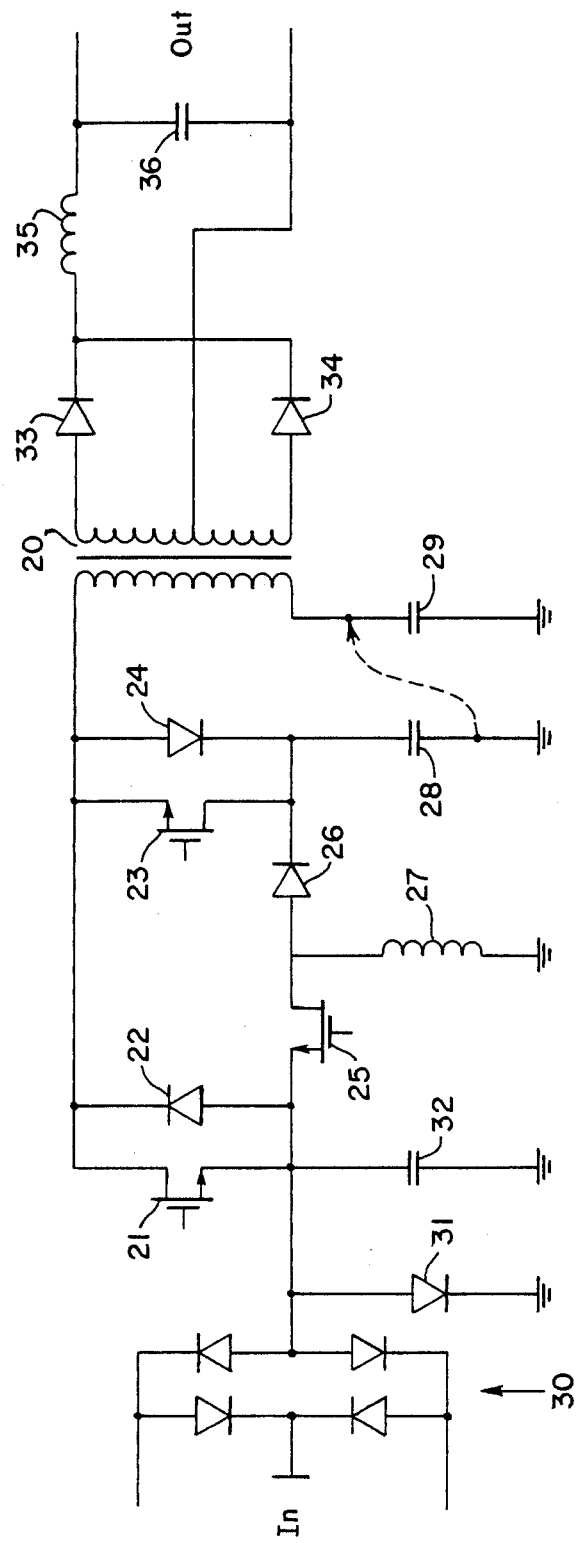
FIG. 2 is the embodiment of high power SPS.

FIG. 2 is the embodiment of high power SPS. The input voltage is AC, e.g. line voltage. The components 30 thru 32 are the same as in FIG. 1. In particular, the diode bridge 30 is coupled in series with the input signal for obtaining a negative rectified voltage. Voltages across the capacitors 28 and 29 do not depend directly on line voltage peak and may be relatively small. For instance, the SPS will operate in European countries, wherein a mechanical switch for determining the capacitor voltages is unnecessary. Inrush, surge currents and voltage spikes are completely eliminated.

The diode 31 is used for power failure protection. Specifically, the diode 31 is coupled between the rectified input signal and ground for conducting a drain current of the transistor 21 when the line voltage is substantially equal zero. The capacitor 32 reduces input current spikes due to interrupted drain currents of the transistors 21 and 25. The capacitor 32 has relatively small value so that the rectified line voltage is crudely filtered. Generally, the secondary of the transformer 20 provides the output signal of the SPS.

A capacitive means is coupled to ground for storing a voltage. A switch means alternatively applies the rectified input signal or capacitive means voltage to the primary. The switch means includes a pair of switches coupled to the primary and further separately coupled to the rectified input signal and capacitive means. Each switch includes a transistor and diode coupled in parallel therewith. A charging means includes a flyback converter for inverting the polarity the rectified input voltage and charging the capacitive means. Therefore, the capacitors 28 and 29 are charged to positive voltages. The capacitor 29 is optional.

The transistors 21 and 23 are n-channel MOSFETs each having source and drain coupled to anode and cathode of the diodes 22 and 24 respectively. Each transistor and diode pair constitutes one switch of the switch means. The diodes prevent any voltage spikes and reverse currents of the respective transistors. The drain of the transistor 21 and source of the transistor 23 are coupled to one end of the primary. The capacitor 29 is coupled to the other end. The sources of the transistors 21 and 25 are tied together which simplifies a driving circuit therefor. The sources are further coupled to the output of diode bridge 30.

When the transistor 21 is on, the transistor 23 is off and the rectified line voltage increased by the voltage stored the capacitor 29 is applied across the primary. Subsequently, the transistors 21 and 23 are turned off and on respectively. A positive voltage equal to a difference of voltages stored in the capacitors 28 and 29 is applied across the primary. Therefore, the transistors 21 and 23 are switched so that voltages of opposite polarities are successively applied across the primary of the transformer 20.

The flyback converter is employed to charge the capacitors 28 and 29 to positive voltages. Specifically, the inductor 27 is coupled to ground for attaining a current. The n-channel MOSFET 25 has source coupled to the output of the bridge 30 and drain coupled to the inductor 27 for applying the rectified input voltage thereto. The diode 26 is conducting the inductor current when the transistor 25 is off as to charge the capacitor 28. The transistor 25 operates independently of the transistors 21 and 23. The input current of the SPS is essentially a sum of the currents flowing thru the transistors 21 and 25. Therefore, sinusoidal input current can be simulated. The power factor is very high.

Moreover, the input current may be substantial even when the input voltage, e.g. line, is 0V (zero volts). In order to minimize any distortions, the input current is a sine wave with DC superimposed thereon. The value of the DC depends on the SPS output current so that the best possible component utilization is accomplished.

In one embodiment, the capacitive means includes the capacitors 28 and 29 coupled to ground and further coupled to the charging means and primary respectively. The currents flowing thru the transistor 23 and diode 26 are applied to the capacitor 28 and have opposite polarities. Accordingly, the capacitor 28 is charged or discharged. The capacitor 29 is charged only once to the nominal voltage, prior to the normal operation of the SPS. Specifically, when the supply first turns on, the transistors 21 and 23 are turned off and on respectively while the transistor 25 is switching. As a result, the capacitors 28 and 29 are charged to the same voltage. Subsequently, the transistor 23 is turned off so that the voltage across the capacitor 28 is further increased.

The capacitor 29 is coupled between the primary and ground. The voltage across the capacitor 29 is stable. The average current flowing thru the primary is substantially equal zero as to prevent a saturation of the transformer 20. The capacitor 29 is discharged when the transistor 21 is on and subsequently charged when the transistor 23 is on. When the positive voltages across the capacitors 29 and 28 are set to be equal respectively once and twice the peak value of the line voltage, the voltage applied across the primary of the transformer 20 varies in range 2:1. However, the voltages across the capacitors 28 and 29 do not depend directly on the peak of the line voltage and may be relatively small, e.g. +100V and +50V respectively.

In another embodiment, the capacitors 28 and 29 are coupled to the primary and further to the charging means and ground respectively, as indicated by dashed line in FIG. 2. The currents flowing thru transistor 23 and diode 26 are applied to the capacitor 28 and have opposite polarities. Accordingly, the capacitor 28 is charged or discharged. Similarly, the currents flowing thru the transistor 21 and diode 26 are applied to the capacitor 29 and have opposite polarities. Accordingly, the capacitor 29 is charged or discharged. The capacitor 29 is charged only once to the nominal voltage, prior to the normal operation of the SPS. Specifically, when the supply first turns on, the transistors 21 and 23 are turned off while the transistor 25 is switching. The drain-source voltage of the transistor 23 is inherently positive.

The voltage across the capacitor 29 depends on the current provided by the charging means. However, the average current flowing thru the primary is substantially equal zero as to prevent a saturation of the transformer 20. Consequently, the sum of average currents flowing thru the transistors 21 and 23 is zero. The ratio of the voltages stored in the capacitors 28 and 29 depends on the capacitance ratio thereof. When positive voltages across the capacitors 29 and 28 are set to be equal the peak value of the line voltage, the voltage applied across the primary of the transformer 20 varies in range 2:1. However, the capacitor voltages do not depend directly on the peak of the line voltage and may be relatively small, e.g. +50V each.

The secondary of the transformer 20 is electromagnetically coupled to the primary and has a center tap coupled to the capacitor 36. The diodes 33 and 34 have anodes coupled to the secondary for rectifying a voltage appearing thereat. The inductor 35 is coupled to cathodes of the diodes 33 and 34 for limiting currents flowing therethrough and reducing output voltage ripple. The capacitor 36 is coupled to the inductor 35 for storing the output voltage of the SPS. When the transistor 23 is on, the voltage across the primary is fixed. Therefore, the voltage provided by the respective diode 33 or 34 is also fixed. Turns ratio of the secondary windings can be optimized.

The embodiments of the present invention described herein are intended to be taken in an illustrative and not a limiting sense. Various modifications and changes may be made to these embodiments by persons skilled in the art without departing from the scope of the present invention as defined in the appended claims.

I claim:

1. Switching power supply converting pulsating input voltage having one polarity into output signal, comprising:
   a first capacitive means coupled to ground for storing a first voltage having the opposite polarity;
   an inductive means coupled in series with the first capacitive means for providing the output signal;
   a second capacitive means coupled to ground for storing a second voltage having the opposite polarity;
   a switch means for alternatively applying the input voltage or second voltage to the inductive means; and
   a charging means coupled to the input voltage for charging the second capacitive means.

2. Switching power supply of claim 1 wherein the inductive means includes a pair of electromagnetically coupled inductors; and
   further including a rectifying means coupled to one inductor for rectifying a signal appearing thereat and providing the output signal.

3. Switching power supply of claim 2 further including an output capacitive means for storing the output signal.

4. Switching power supply of claim 1 wherein the switch means includes a pair of switches coupled to the inductive means and further separately coupled to the input voltage and second voltage.

5. Switching power supply of claim 4 wherein each switch includes a transistor and diode coupled in parallel therewith.

6. Switching power supply of claim 1 wherein the charging means includes:
   a second inductive means coupled to ground for attaining a current;
   a second switch means for applying the input voltage to the second inductive means; and
   a rectifying means for conducting the current and charging the second capacitive means.

7. Switching power supply of claim 1 further including a rectifying means for rectifying an AC input signal and providing the input voltage.

8. Switching power supply of claim 1 further including a diode means coupled between the input voltage and ground for conducting a current when the input voltage is substantially equal zero.

9. Switching power supply of claim 1 further including an input capacitive means coupled to the input voltage for reducing input current spikes.

10. Switching power supply converting pulsating input voltage having one polarity into output signal, comprising:
    a node;
    a first capacitive means coupled between the node and ground for storing a first voltage;
    an inductive means coupled to the node for providing the output signal;
    a second capacitive means coupled to the node for storing a second voltage having the opposite polarity with reference to the node;
    a switch means for alternatively applying the input voltage or second voltage to the inductive means; and
    a charging means coupled to the input voltage for charging the first and second capacitive means.

11. Switching power supply of claim 10 wherein the inductive means includes a pair of electromagnetically coupled inductors; and
    further including a rectifying means coupled to one inductor for rectifying a signal appearing thereat and providing the output signal.

12. Switching power supply of claim 11 further including an output capacitive means for storing the output signal.

13. Switching power supply of claim 10 wherein the switch means includes a pair of switches coupled to the inductive means and further separately coupled to the input voltage and second voltage.

14. Switching power supply of claim 13 wherein each switch includes a transistor and diode coupled in parallel therewith.

15. Switching power supply of claim 10 wherein the charging means includes:
    a second inductive means coupled to ground for attaining a current;
    a second switch means for applying the input voltage to the inductive means; and
    a rectifying means for conducting the current and charging the second capacitive means.

16. Switching power supply of claim 10 further including a rectifying means for rectifying an AC input signal and providing the input voltage.

17. Switching power supply of claim 10 further including a diode means coupled between the input voltage and ground for conducting a current when the input voltage is substantially equal zero.

18. Switching power supply of claim 10 further including an input capacitive means coupled to the input voltage for reducing input current spikes.

* * * * *